United States Patent
Malhotra

(10) Patent No.: US 10,371,101 B2
(45) Date of Patent: Aug. 6, 2019

(54) DUAL-FUEL ENGINE WITH LIQUID-GAS SEPARATION UNIT

(71) Applicant: Progress Rail Locomotive Inc., LaGrange, IL (US)

(72) Inventor: Rakesh R. Malhotra, Aurora, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 29 days.

(21) Appl. No.: 15/372,617

(22) Filed: Dec. 8, 2016

(65) Prior Publication Data

US 2018/0163667 A1    Jun. 14, 2018

(51) Int. Cl.
  *F02M 21/02*    (2006.01)
  *F02M 29/06*    (2006.01)

(52) U.S. Cl.
  CPC ...... *F02M 21/0227* (2013.01); *F02M 21/023* (2013.01); *F02M 21/0215* (2013.01); *F02M 21/0248* (2013.01); *F02M 29/06* (2013.01); *Y02T 10/32* (2013.01); *Y02T 10/36* (2013.01)

(58) Field of Classification Search
  CPC ............. F02M 21/0227; F02M 21/023; F02M 21/0215; F02M 21/0248; F02M 29/06
  See application file for complete search history.

(56) References Cited

U.S. PATENT DOCUMENTS

| 5,085,198 A | 2/1992 | Bartlett et al. |
| 5,560,344 A | 10/1996 | Chan |
| 6,647,973 B1 | 11/2003 | Schueler et al. |
| 2009/0250468 A1 | 10/2009 | Whelan et al. |
| 2013/0098333 A1* | 4/2013 | Kim ........................ F02M 43/04 123/445 |

FOREIGN PATENT DOCUMENTS

| CN | 20223610 U | * 11/2011 |
| CN | 202023610 U | * 11/2011 |
| DE | 102007016943 | 10/2008 |
| DE | 102012206979 | 10/2013 |

* cited by examiner

*Primary Examiner* — Jacob M Amick
*Assistant Examiner* — Charles Brauch

(57) ABSTRACT

A liquid-gas separation unit of a dual-fuel engine is provided. The liquid-gas separation unit includes an exhaust conduit and a separator mounted on the exhaust conduit. The exhaust conduit has a first end and a second end distal to the first end. The first end of the exhaust conduit is coupled to a gaseous fuel supply conduit of the dual-fuel engine for receiving a leaked liquid fuel and a gaseous fuel. The leaked liquid fuel is received from at least one injector of the dual-fuel engine. Further, the separator is adapted to separate the leaked liquid fuel from the gaseous fuel before ejecting the gaseous fuel through the second end of the exhaust conduit.

20 Claims, 9 Drawing Sheets

DUAL-FUEL ENGINE WITH LIQUID-GAS SEPARATION UNIT

TECHNICAL FIELD

The present disclosure relates to fuel circulation systems, and more particularly to a liquid-gas separation unit of a fuel circulation system of a dual-fuel engine.

BACKGROUND

In the last few decades, dual-fuel engines have gained widespread popularity owing to their efficient operation. As the name suggests, dual-fuel engines selectively operate on two fuels in order to optimize an operational efficiency. For example, nowadays, dual-fuel engines operating on a natural gas fuel and a diesel fuel are employed in locomotives. Such dual-fuel engines usually include separate conduits for supplying the diesel fuel and the natural gas fuel to fuel injectors. For example, the natural gas fuel and the diesel fuel may be delivered to the fuel injectors through a first conduit and a second conduit, respectively. The dual fuel-engines may switch between the diesel fuel and the natural gas fuel to maintain a high operational efficiency.

When a dual-fuel engine is in a non-operational mode, i.e., when the dual-fuel engine is not operating, the natural gas in a high-pressure state stuck in the first conduit is released to atmosphere through an exhaust conduit. However, sometimes, due to leakage in the fuel injectors, the diesel fuel from the fuel injectors flows back and enters the first conduit. Therefore, the diesel fuel may also get released into the atmosphere through the exhaust conduit along with the natural gas. Such wastage of the diesel fuel and the consequential maintenance lead to a significant increase in operational cost of the dual-fuel engine.

German Patent Publication No. 102012206979 A1 (hereinafter the '979 publication), discloses a system having a separating device. The system has a fuel injector supplying fuel by a high pressure injection rail. The separating device is arranged in a line and separates fuel, e.g., diesel, and fluid, i.e., water, from each other. The fluid is restored into a fluid container by a return-flow pipe. A first valve is arranged between a fluid pump and a mixing device, a second valve is arranged between the high pressure injection rail and separating device, and a third valve is arranged between the separating device and fluid pump. The system of the '979 publication does not disclose a separating device for a dual-fuel engine.

SUMMARY OF THE DISCLOSURES

In one embodiment of the present disclosure, a liquid-gas separation unit of a dual-fuel engine is disclosed. The liquid-gas separation unit includes an exhaust conduit and a separator mounted on the exhaust conduit. The exhaust conduit has a first end and a second end distal to the first end. The first end is coupled to a gaseous fuel supply conduit of the dual-fuel engine for receiving a leaked liquid fuel and a gaseous fuel. The leaked liquid fuel is received from at least one injector of the dual-fuel engine. Further, the separator is adapted to separate the leaked liquid fuel from the gaseous fuel before ejecting the gaseous fuel through the second end of the exhaust conduit.

In another embodiment of the present disclosure, a fuel circulation system of a dual-fuel engine is disclosed. The fuel circulation system includes a gaseous fuel supply conduit and a liquid-gas separation unit coupled to the gaseous fuel supply conduit. The gaseous fuel supply conduit includes a first end and a second end distal to the first end. The first end is adapted to receive gaseous fuel into the fuel circulation system and the second end is coupled to at least one injector. The gaseous fuel supply conduit is adapted to supply the gaseous fuel from the first end to the at least one injector. Further, the liquid-gas separation unit includes an exhaust conduit and a separator mounted on the exhaust conduit. The exhaust conduit includes a first end and a second end distal to the first end. The first end is coupled to the gaseous fuel supply conduit. The exhaust conduit is adapted to receive a leaked liquid fuel from the at least one injector and the gaseous fuel from the gaseous fuel supply conduit. The separator is adapted to separate the leaked liquid fuel from the gaseous fuel before ejecting the gaseous fuel through the second end of the exhaust conduit.

In yet another embodiment of the present disclosure, a dual-fuel engine is disclosed. The dual-fuel engine includes at least one combustion chamber, at least one injector, and a fuel circulation system coupled to the at least one injector. The at least one injector is adapted to inject at least one of a gaseous fuel and a liquid fuel into the at least one combustion chamber. The fuel circulation system includes a gaseous fuel supply conduit, a gaseous fuel conditioning module mounted on the gaseous fuel supply conduit, a check valve disposed downstream to the gaseous fuel conditioning module, and a liquid-gas separation unit coupled to the gaseous fuel supply conduit. The gaseous fuel supply conduit includes a first end and a second end distal to the first end. The first end is adapted to receive the gaseous fuel into the fuel circulation system and the second end is coupled to at least one injector. The gaseous fuel supply conduit is adapted to supply the gaseous fuel from the first end to the at least one injector. The gaseous fuel conditioning module is adapted to condition the gaseous fuel for use in the dual-fuel engine before the gaseous fuel is supplied to the at least one injector. Further, the check valve is adapted to stop a flow of a leaked liquid fuel from the at least one injector towards the gaseous fuel conditioning module. The liquid-gas separation unit includes an exhaust conduit and a separator mounted on the exhaust conduit. The exhaust conduit includes a first end and a second end distal to the first end. The first end is coupled to the gaseous fuel supply conduit at a location downstream to the check valve. The exhaust conduit is adapted to receive the leaked liquid fuel and the gaseous fuel from the gaseous fuel supply conduit. The separator is adapted to separate the leaked liquid fuel from the gaseous fuel before ejecting the gaseous fuel through the second end of the exhaust conduit.

Other features and aspects of this disclosure will be apparent from the following description and the accompanying drawings.

DETAILED DESCRIPTION

Figure 1:
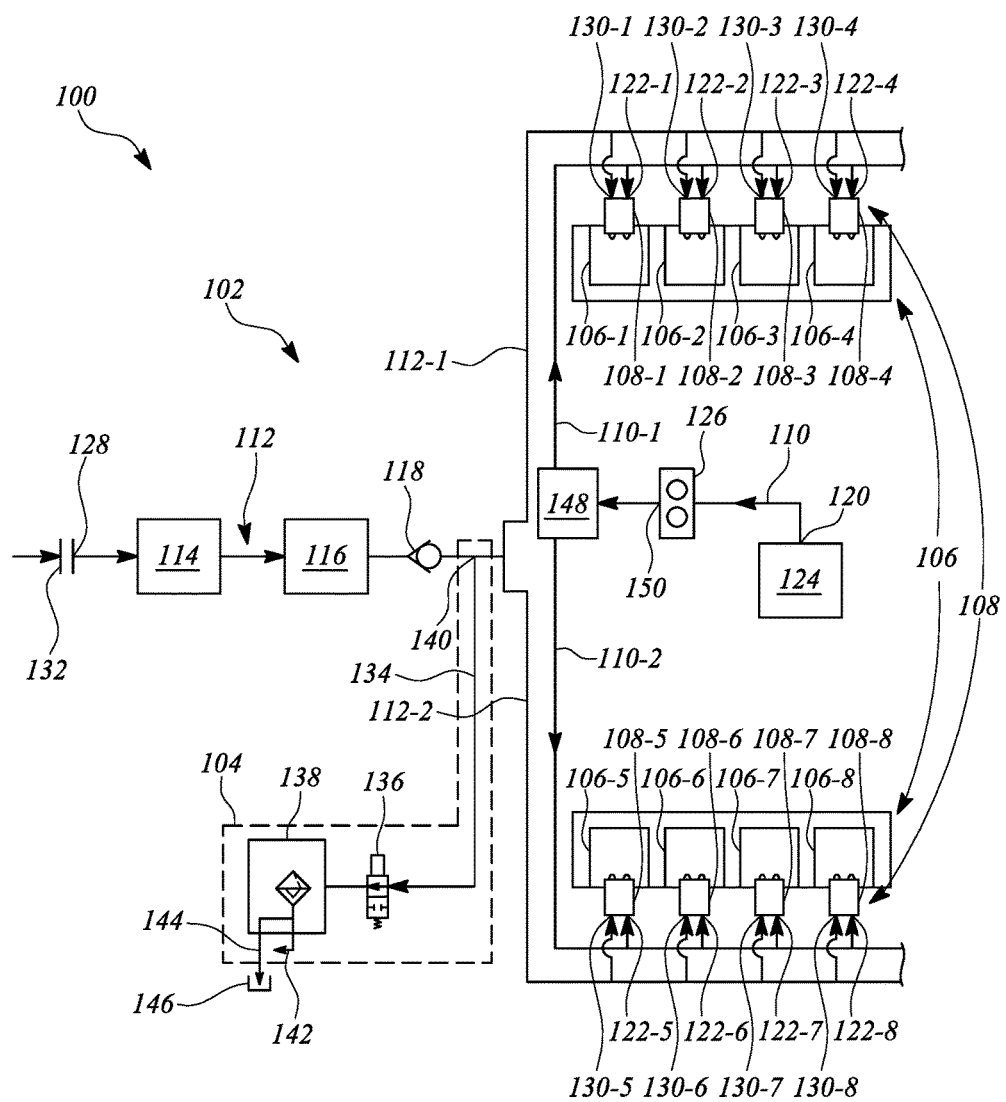
FIG. 1 is a block diagram of a portion of a dual-fuel engine having a fuel circulation system with a liquid-gas separation unit, according to one embodiment of the present disclosure.

Wherever possible, the same reference numbers will be used throughout the drawings to refer to the same or the like parts. FIG. 1 illustrates a block diagram of a portion of a dual-fuel engine 100 having a fuel circulation system 102 with a liquid-gas separation unit 104, according to one embodiment of the present disclosure. In the present embodiment, the dual-fuel engine 100 may be an internal combustion engine employed in a locomotive (not shown).

The dual-fuel engine 100 may be adapted to operate in a plurality of operational modes. The plurality of operational modes may include, but is not limited to, a liquid fuel operational mode and a dual-fuel operational mode. As the name suggests, in the liquid fuel operational mode, the dual-fuel engine 100 may be adapted to operate on a liquid fuel. Further, in the dual-fuel operational mode, the dual-fuel engine 100 may be adapted to operate on the liquid fuel as well as a gaseous fuel. In one embodiment, the liquid fuel may be diesel and the gaseous fuel may be natural gas. The liquid fuel and the gaseous fuel may hereinafter collectively be referred to as fuel.

In one embodiment, the dual-fuel engine 100 may be adapted to switch selectively between the operational modes, based on a variety of operational and constructional parameters. Such operational and constructional parameters may include, but are not limited to, an operational efficiency, an operating load, and an availability of fuel.

In one embodiment, the dual-fuel engine 100 may include at least one combustion chamber 106, at least one injector 108 mounted on the at least one combustion chamber 106, and the fuel circulation system 102 coupled to the at least one injector 108. In the illustrated embodiment, the dual-fuel engine 100 may include eight combustion chambers 106 which may individually be referred to as a combustion chamber 106-1, a combustion chamber 106-2, a combustion chamber 106-3, a combustion chamber 106-4, a combustion chamber 106-5, a combustion chamber 106-6, a combustion chamber 106-7, and a combustion chamber 106-8, and collectively be referred to as combustion chambers 106.

As shown in the present embodiment, the combustion chambers 106 may be disposed in a V-type configuration with four combustion chambers 106 on each side of the V-type configuration. In other embodiments, a number and a positioning of the combustion chambers 106 may vary, without departing from the scope of the present disclosure. For example, a fewer or more number of the combustion chambers 106 may be disposed in an inline configuration. The combustion chambers 106 may facilitate the combustion of the fuel injected by the at least one injector 108.

The at least one injector 108 may be adapted to inject at least one of the gaseous fuel and the liquid fuel into the at least one combustion chamber 106 for combustion. In the present embodiment, the dual-fuel engine 100 may include eight injectors 108, one for each of the combustion chambers 106. The eight injectors 108 may individually be referred to as an injector 108-1, an injector 108-2, an injector 108-3, an injector 108-4, an injector 108-5, an injector 108-6, an injector 108-7, and an injector 108-8, and collectively be referred to as injectors 108. In the present embodiment, since the combustion chambers 106 are disposed in the V-type configuration, the injectors 108 may also be disposed in the V-type configuration to inject the fuel into the combustion chambers 106. The injectors 108 may receive the fuel to inject into the combustion chambers 106 from the fuel circulation system 102.

In one embodiment, the fuel circulation system 102 may be adapted to circulate the fuel in the dual-fuel engine 100. In one embodiment, the fuel circulation system 102 may include a liquid fuel supply conduit 110, a gaseous fuel supply conduit 112, a gaseous fuel supply module 114 mounted on the gaseous fuel supply conduit 112, a gaseous fuel conditioning module 116 disposed downstream to the gaseous fuel supply module 114, a check valve 118 disposed downstream to the gaseous fuel conditioning module 116, and the liquid-gas separation unit 104 coupled to the gaseous fuel supply conduit 112.

In one embodiment, the liquid fuel supply conduit 110 may be adapted to supply the liquid fuel to the injectors 108. The liquid fuel supply conduit 110 may include a first end 120 and a second end 122 distal to the first end 120. The first end 120 may be coupled to a liquid fuel tank 124 whereas the second end 122 may be coupled to the at least one injector 108. The first end 120 may be adapted to receive the liquid fuel into the fuel circulation system 102. Therefore, the liquid fuel supply conduit 110 may be adapted to supply the liquid fuel from the first end 120, for example, from the liquid fuel tank 124 to the at least one injector 108.

In one embodiment, the dual-fuel engine 100 may further include a pump 126 and a junction block 148 mounted on the liquid fuel supply conduit 110. The pump 126 may be adapted to pump the liquid fuel from the liquid fuel tank 124 to the injectors 108. In particular, the pump 126 may pump the liquid fuel to the junction block 148 through an outlet 150. Further, the liquid fuel from the junction block 148 may be supplied to the injectors 108.

In the present embodiment, based on the V-type configuration of the eight injectors 108, after the junction block 148, the liquid fuel supply conduit 110 may be disposed as a first liquid fuel supply conduit 110-1 and a second liquid fuel supply conduit 110-2. The first liquid fuel supply conduit 110-1 and the second liquid fuel supply conduit 110-2 may collectively be referred to as the liquid fuel supply conduit 110.

Further, the liquid fuel supply conduit 110 may be coupled to the eight injectors 108 through eight second ends 122. The eight second ends 122 may individually be referred to as a second end 122-1, a second end 122-2, a second end 122-3, a second end 122-4, a second end 122-5, a second end 122-6, a second end 122-7, and a second end 122-8. For example, the liquid fuel supply conduit 110-1 may be coupled to the injector 108-1 through the second end 122-1. Similarly, the liquid fuel supply conduit 110-1 may be coupled to the injector 108-2 through the second end 122-2.

Further, the gaseous fuel supply conduit 112 may be adapted to supply the gaseous fuel to the injectors 108. The gaseous fuel supply conduit 112 may include a first end 128 and a second end 130 distal to the first end 128. The first end 128 may be adapted to receive the gaseous fuel into the fuel circulation system 102 whereas the second end 130 may be coupled to the at least one injector 108. Therefore, the gaseous fuel supply conduit 112 may receive the gaseous fuel from the first end 128 and supply the gaseous fuel to the at least one injector 108 through the second end 130. In one embodiment, the first end 128 of the gaseous fuel supply conduit 112 may be coupled to a coupling 132 of the locomotive. The gaseous fuel may be received in the gaseous fuel supply conduit 112 from a tender (not shown) through the coupling 132.

In the present embodiment, in order to feed the gaseous fuel to the injectors 108 positioned in the V-type configuration, the gaseous fuel supply conduit 112 may split into a first gaseous fuel supply conduit 112-1 and a second gaseous fuel supply conduit 112-2 downstream to the gaseous fuel conditioning module 116. The first gaseous fuel supply conduit 112-1 and the second gaseous fuel supply conduit 112-2 may collectively be referred to as the gaseous fuel supply conduit 112. Further, the gaseous fuel supply conduit 112 may be coupled to the injectors 108 through eight second ends 130, individually referred to as a second end 130-1, a second end 130-2, a second end 130-3, a second end 130-4, a second end 130-5, a second end 130-6, a second end 130-7, and a second end 130-8. For example, the gaseous fuel supply conduit 112-1 may be coupled to the injector 108-1 through the second end 130-1. Similarly, the gaseous fuel supply conduit 112-1 may be coupled to the injector 108-2 through the second end 130-2.

Upon entering into the gaseous fuel supply conduit 112 from the first end 128, the gaseous fuel may pass through the gaseous fuel supply module 114. In one embodiment, the gaseous fuel supply module 114 may be adapted to perform operations pertaining to supply of the gaseous fuel to the at least one injector 108. For example, in one embodiment, the gaseous fuel supply module 114 may include a regulator (not shown) adapted to regulate a quantity and a flow rate of the gaseous fuel to be supplied to the at least one injector 108. In another embodiment, the gaseous fuel supply module 114 may include a valve (not shown) for allowing or blocking the supply of the gaseous fuel towards the at least one injector 108.

After passing through the gaseous fuel supply module 114, the gaseous fuel may pass through the gaseous fuel conditioning module 116 mounted on the gaseous fuel supply conduit 112. The gaseous fuel conditioning module 116 may be adapted to condition the gaseous fuel for combustion in the combustion chambers 106. Therefore, the gaseous fuel conditioning module 116 may transform the gaseous fuel in a usable form before the gaseous fuel may be supplied to the at least one injector 108 through the second end 130 of the gaseous fuel supply conduit 112.

For example, in one embodiment, the gaseous fuel conditioning module 116 may be adapted to regulate a pressure and a temperature of the gaseous fuel. In another embodiment, the gaseous fuel conditioning module 116 may be adapted to condition the gaseous fuel by eliminating impurities from the gaseous fuel. After being conditioned by the gaseous fuel conditioning module 116, the gaseous fuel may be supplied to the at least one injector 108.

In order to stop a back flow of the gaseous fuel from the injectors 108 towards the gaseous fuel conditioning module 116, the check valve 118 may be mounted on the gaseous fuel supply conduit 112. In embodiment, the check valve 118 may be a one-way valve which may allow the gaseous fuel to flow from the gaseous fuel conditioning module 116 towards the injectors 108 but may restrict the flow of the gaseous fuel from the injectors 108 towards the gaseous fuel conditioning module 116.

Further, the dual-fuel engine 100 may include the liquid-gas separation unit 104 coupled to the gaseous fuel supply conduit 112. In the present embodiment, the liquid-gas separation unit 104 may be coupled to the gaseous fuel supply conduit 112 at a location downstream to the check valve 118. The liquid-gas separation unit 104 may include an exhaust conduit 134, a vent valve 136 mounted on the exhaust conduit 134, and a separator 138 disposed downstream to the vent valve 136. The exhaust conduit 134 may include a first end 140 and a second end 142 distal to the first end 140. The first end 140 may be coupled to the gaseous fuel supply conduit 112 at the location downstream to the check valve 118.

During normal operation of the dual-fuel engine 100, i.e., without any fuel leakage, the check valve 118 may block a flow of the gaseous fuel towards the gaseous fuel conditioning module 116. Therefore, the gaseous fuel stuck in the gaseous fuel supply conduit 112 may be directed towards the exhaust conduit 134.

Further, the vent valve 136 may be adapted to allow or restrict a flow of the gaseous fuel towards the second end 142 of the exhaust conduit 134. In an open state, the vent valve 136 may allow the flow of the gaseous fuel towards the second end 142. In a closed state, the vent valve 136 may block the flow of the gaseous fuel towards the second end 142.

In one embodiment, when the dual-fuel engine 100 is operating in the liquid fuel operational mode, the liquid fuel from the injectors 108 may leak into the gaseous fuel supply conduit 112. The liquid fuel leaked into the gaseous fuel supply conduit 112 is hereinafter referred to as leaked liquid fuel. The gaseous fuel supply conduit 112 may carry the gaseous fuel as well as the leaked liquid fuel.

In one embodiment, the gaseous fuel may be vented out of the fuel circulation system 102 along with the leaked liquid fuel, when the dual-fuel engine 100 is in a non-operational mode, for example, when the dual-fuel engine 100 is not operating. In such an embodiment, the check valve 118 may be adapted to block the flow of a mixture of the leaked liquid fuel and the gaseous fuel towards the gaseous fuel conditioning module 116. The mixture may get directed into the exhaust conduit 134. Therefore, when the dual-fuel engine 100 is in the non-operational mode, the exhaust conduit 134 may be adapted to receive the leaked liquid fuel that is mixed with the gaseous fuel in the liquid fuel operational mode.

When the vent valve 136 is in the open state, the leaked liquid fuel and the gaseous fuel may pass through the vent valve 136 and flow towards the separator 138. The separator 138 may be adapted to separate the leaked liquid fuel from the gaseous fuel before ejecting the gaseous fuel through the second end 142 of the exhaust conduit 134.

In one embodiment, the leaked liquid fuel may exit the separator 138 through a third end 144 of the exhaust conduit 134. In one embodiment, the leaked liquid fuel exiting from the separator 138 may be delivered to a leaked fuel reservoir 146 for further usage. In another embodiment, after separation, the leaked liquid fuel may be stored in the separator 138. In such an embodiment, the leaked liquid fuel may be collected from the separator 138 after predefined time intervals. Constructional and operational features of the separator 138 are explained in detail in the description of FIG. 3, FIG. 4, FIG. 5, FIG. 6, FIG. 7, FIG. 8, and FIG. 9.

Figure 2:
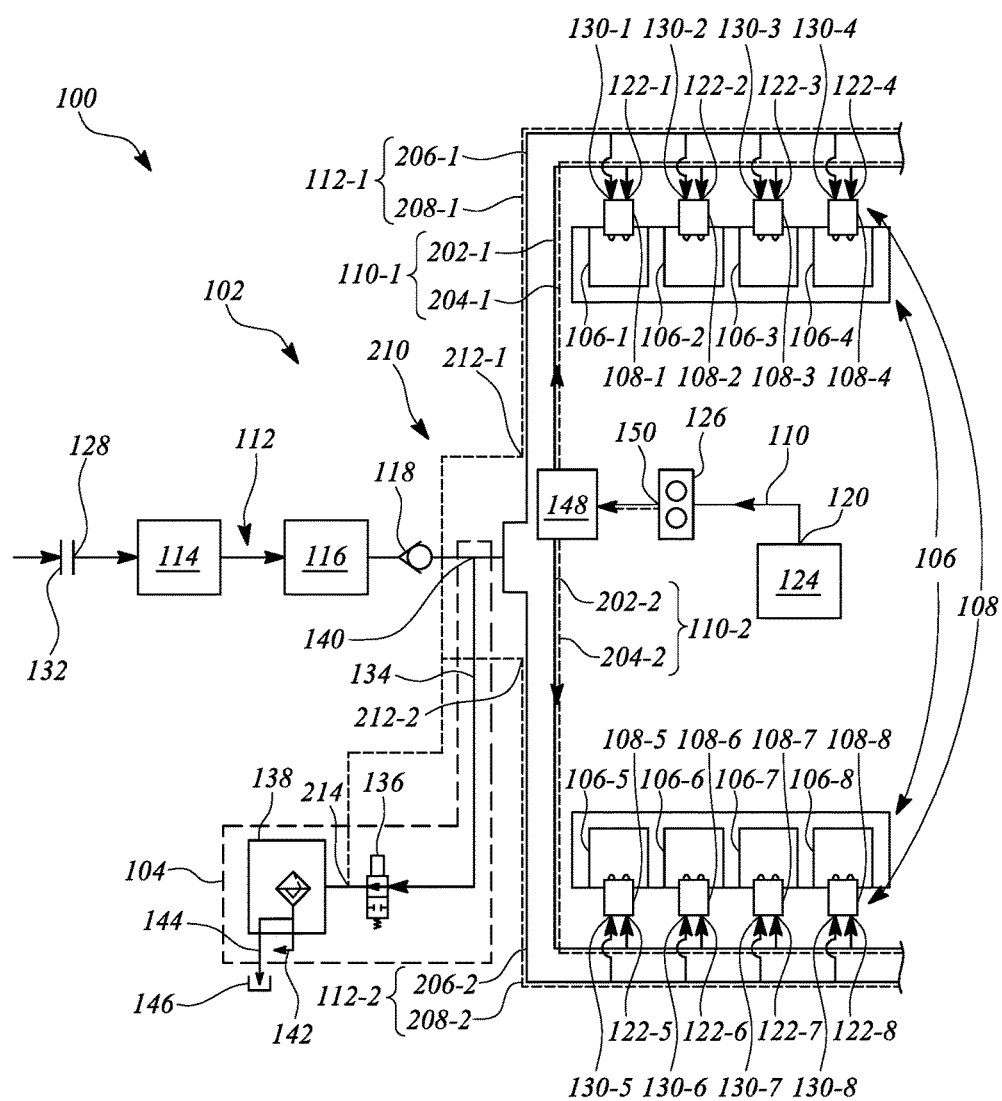
FIG. 2 is a block diagram of a portion of the dual-fuel engine having the fuel circulation system with the liquid-gas separation unit, according to another embodiment of the present disclosure.

FIG. 2 illustrates a block diagram of the portion of the dual-fuel engine 100 having the fuel circulation system 102 with the liquid-gas separation unit 104, according to another embodiment of the present disclosure. In the present embodiment, the exhaust conduit 134 may be adapted to receive the leaked liquid fuel along with the gaseous fuel when the dual-fuel engine 100 is in the operational mode.

In the present embodiment, each of the liquid fuel supply conduit 110 and the gaseous fuel supply conduit 112 may be double-walled in construction. For example, the liquid fuel supply conduit 110 may include an inner tube 202 and an outer tube 204 positioned concentrically with respect to the inner tube 202. Therefore, in case of any leakage of the liquid fuel from the inner tube 202, the leaked liquid fuel may be contained by the outer tube 204. Similarly, the gaseous fuel supply conduit 112 may include an inner tube 206 and an outer tube 208 positioned concentrically with respect to the inner tube 206 such that any leakage of the gaseous fuel from the inner tube 206 may be contained by the outer tube 208.

In one example, the first liquid fuel supply conduit 110-1 may include an inner tube 202-1 and an outer tube 204-1. Similarly, the second liquid fuel supply conduit 110-2 may include an inner tube 202-2 and an outer tube 204-2. Further, the first gaseous fuel supply conduit 112-1 may include an inner tube 206-1 and an outer tube 208-1. Similarly, the second gaseous fuel supply conduit 112-2 may include an inner tube 206-2 and an outer tube 208-2. The inner tube 202 and the inner tube 206 may collectively be referred to as inner tubes 202, 206. Similarly, the outer tube 204 and the outer tube 208 may collectively be referred to as outer tubes 204, 208.

In one example, the leakage from the inner tubes 202, 206 may occur at joints (not shown) of the inner tubes 202, 206 with the corresponding outer tubes 204, 208.

In the present embodiment, the fuel circulation system 102 may include a drainage conduit 210 coupling the outer tubes 204, 208 to the exhaust conduit 134. The drainage conduit 210 may include a first end 212 and a second end 214 distal to the first end 212. The first end 212 may be coupled to the outer tubes 204, 208 and the second end 214 may be coupled to the exhaust conduit 134. In one embodiment, the drainage conduit 210 may be coupled to the exhaust conduit 134 at a location downstream to the vent valve 136.

In the operational mode, the leakage of the gaseous fuel contained in the outer tube 204 of the gaseous fuel supply conduit 112 and the leakage of the liquid fuel contained in the outer tube 208 of the liquid fuel supply conduit 110 may be directed to the exhaust conduit 134 through the drainage conduit 210. In one embodiment, the leaked gaseous fuel and the leaked liquid fuel may pass through the separator 138. The separator 138 may separate the leaked liquid fuel from the leaked gaseous fuel, and may eject the leaked liquid fuel and the leaked gaseous fuel through the second end 142 and the third end 144 of the exhaust conduit 134, respectively. In one embodiment, a mixture of the leaked liquid fuel and the gaseous fuel in the non-operational mode, and a mixture of the leaked liquid fuel and the leaked gaseous fuel in the operational mode may be individually referred to as mixture in the description of FIG. 3, FIG. 4, FIG. 5, FIG. 6, FIG. 7, FIG. 8, and FIG. 9.

Figure 3:
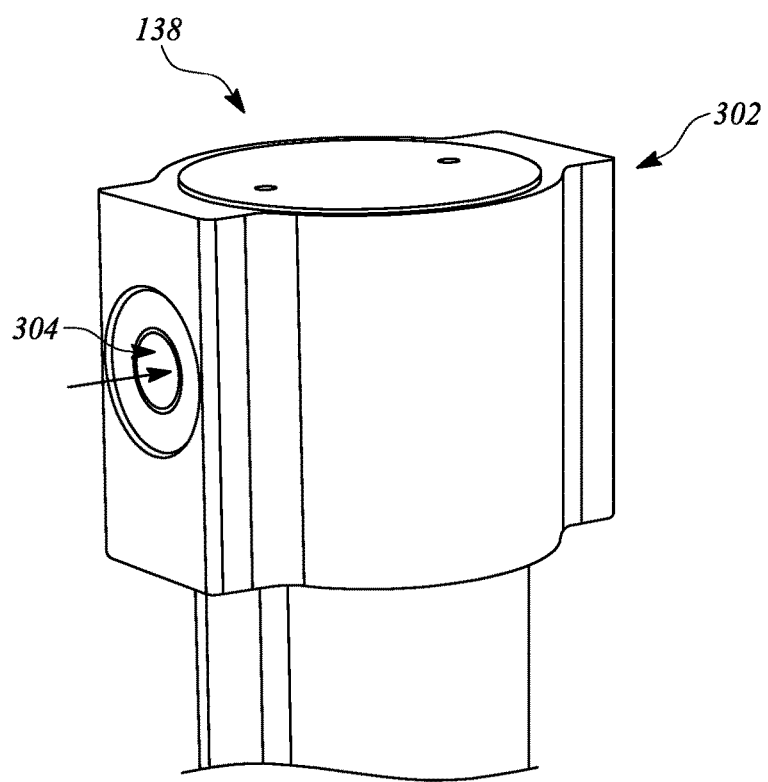
FIG. 3 is a perspective view of a separator of the liquid-gas separation unit, according to one embodiment of the present disclosure.

FIG. 3 illustrates a perspective view of the separator 138 of the liquid-gas separation unit 104, according to one embodiment of the present disclosure. The separator 138 may include a housing 302 having an inlet 304 for the mixture. The inlet 304 of the separator 138 may be adapted to receive the mixture from the exhaust conduit 134.

Figure 4:
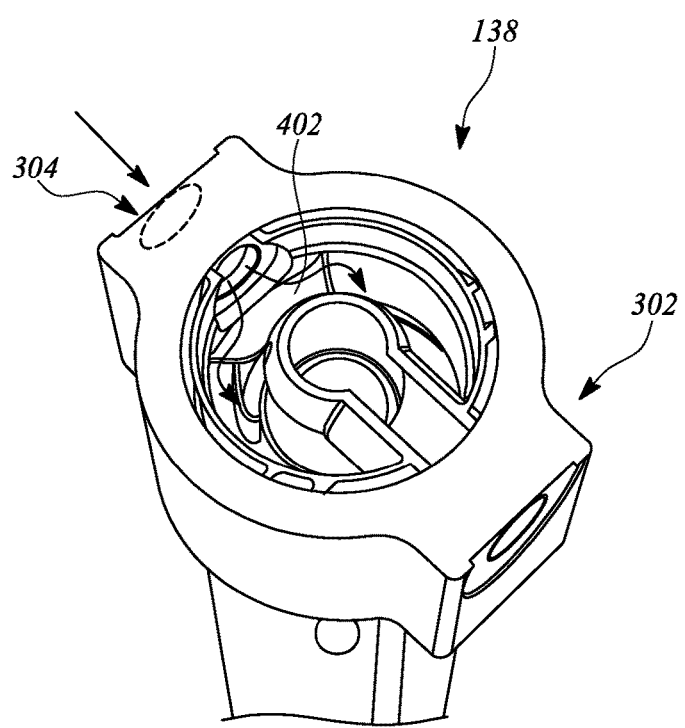
FIG. 4 is a top perspective view of the separator, according to one embodiment of the present disclosure.

FIG. 4 illustrates a top perspective view of the separator 138 depicting an entry of the mixture into the separator 138, according to one embodiment of the present disclosure. As shown, the separator 138 may include a plurality of guide vanes 402 enclosed within the housing 302. The guide vanes 402 may be adapted to guide the mixture within the housing 302.

Figure 5:
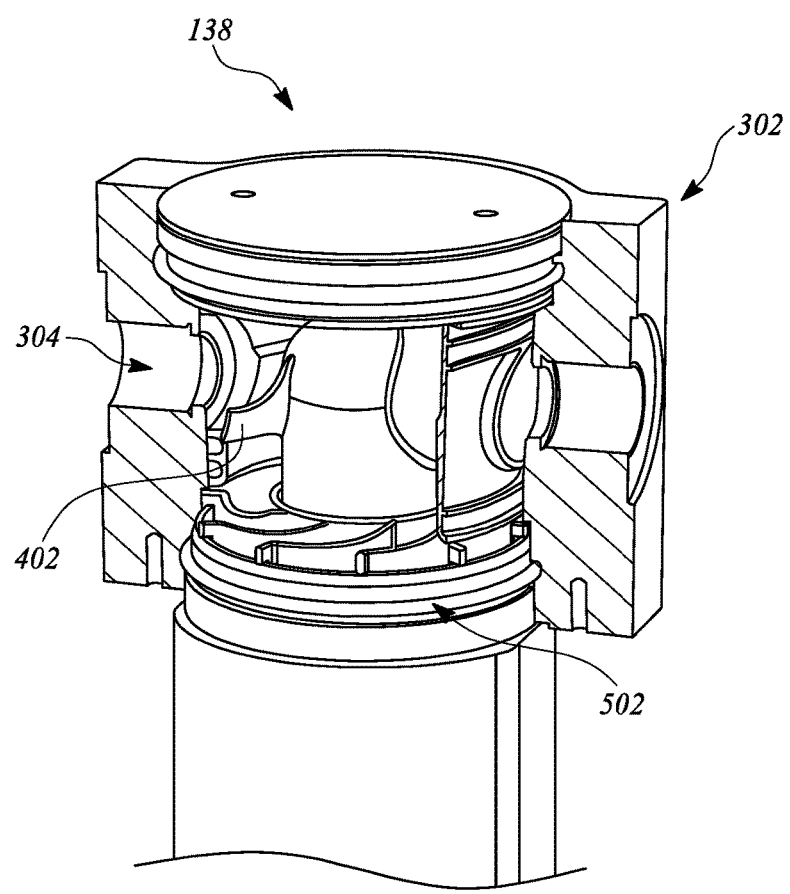
FIG. 5 is a cross-sectional perspective of the separator, according to one embodiment of the present disclosure.
Figure 6:
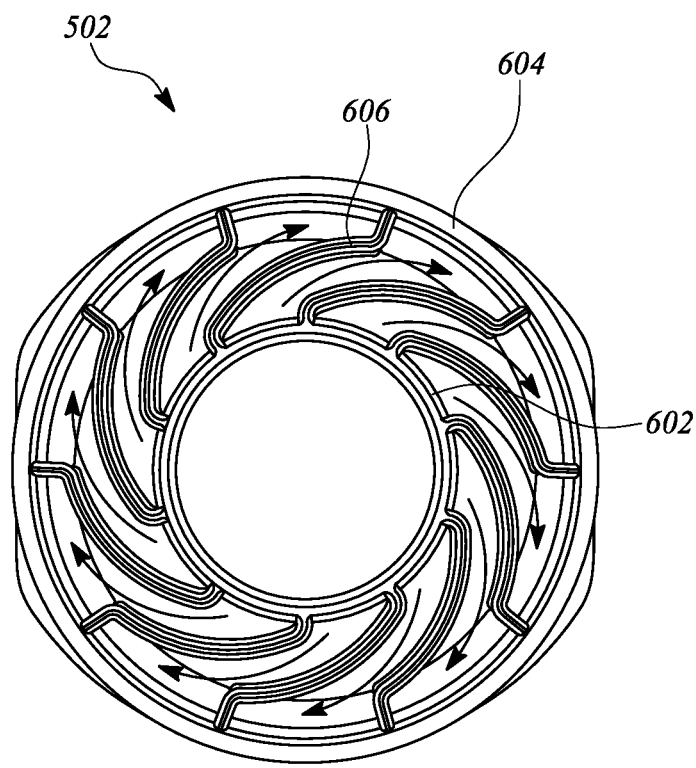
FIG. 6 is a top view of a plurality of baffle plates of the separator, according to one embodiment of the present disclosure.

FIG. 5 illustrates a cross-sectional side view of the separator 138, according to one embodiment of the present disclosure. After maneuvering around the guide vanes 402, the mixture may move in a downward direction towards a separation component 502 of the separator 138. FIG. 6 illustrates a top view of the separation component 502, according to one embodiment of the present disclosure. The separation component 502 may include an inner wall 602, an outer wall 604, and a plurality of baffle plates 606 disposed between the inner wall 602 and the outer wall 604. In one embodiment, the baffle plates 606 may extend in a radial direction from the inner wall 602 towards the outer wall 604.

Figure 7:
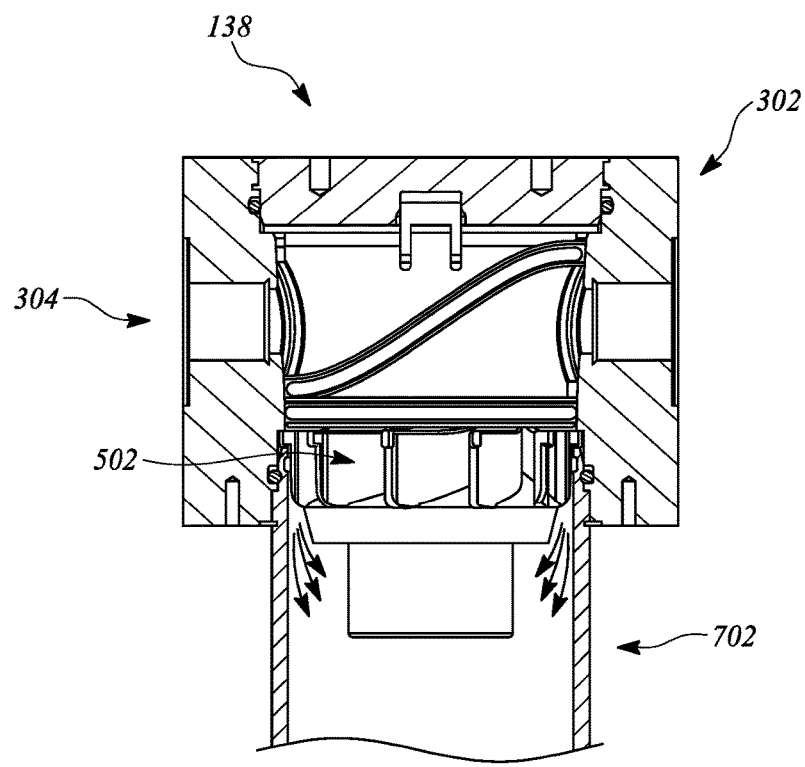
FIG. 7 is a cross-sectional side view of the separator, according to one embodiment of the present disclosure.
Figure 8:
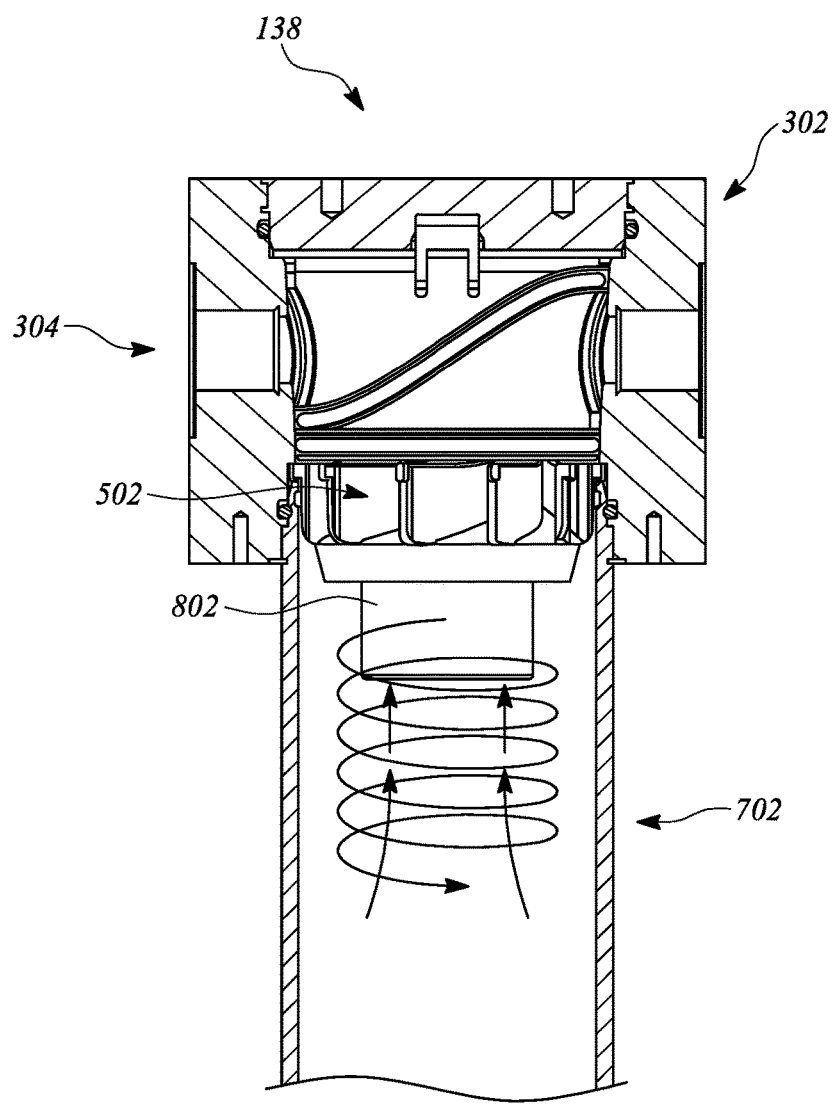
FIG. 8 is a cross-sectional side view of the separator, according to one embodiment of the present disclosure.

FIG. 7 illustrates another cross-sectional side view of the separator 138, according to one embodiment of the present disclosure. As shown, while passing through the baffle plates 606, a vortex is created resulting into a swirling effect of the mixture for separating the leaked liquid fuel from the gaseous fuel. Subsequently, the mixture may move towards a lower section 702 of the housing 302. FIG. 8 illustrates a cross-sectional side view of the separator 138 depicting the swirling effect created for the mixture. As a result of the swirling effect, the leaked liquid fuel may move in a downward direction from the lower section 702 whereas the gaseous fuel moves in an upward direction towards a mouth 802 of the separation component 502. The mouth 802 may be coupled to the inner wall 602 of the separation component 502. The leaked liquid fuel collected in the lower section 702 may be supplied to the leaked fuel reservoir 146 through the third end 144 of the separator 138.

Figure 9:
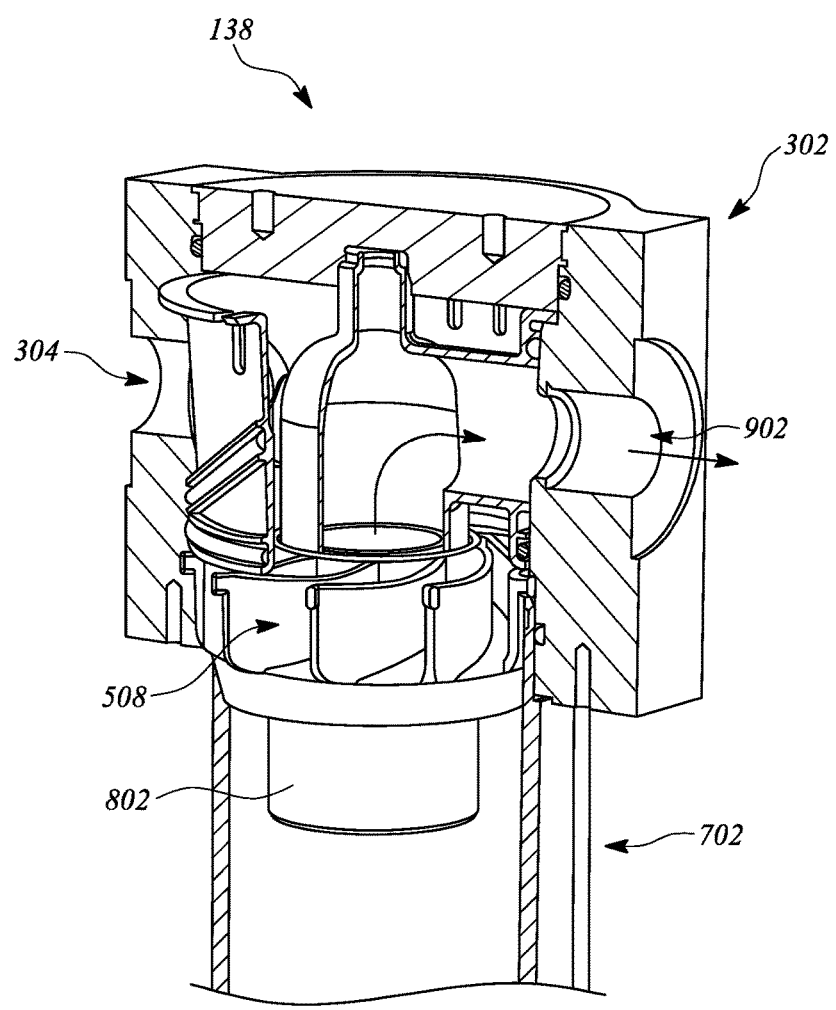
FIG. 9 is a cross-sectional perspective view of the separator, according to one embodiment of the present disclosure.

FIG. 9 illustrates a cross-sectional perspective view of the separator 138 depicting an exit of the gaseous fuel from the separator 138, according to one embodiment of the present disclosure. Therefore, the gaseous fuel passes through the inner wall 602 of the separation component 502 towards an outlet 902 of the separator 138. The gaseous fuel may then be ejected through the second end 142 of the separator 138.

Industrial Applicability

The present disclosure relates to the liquid-gas separation unit 104, the fuel circulation system 102 having the liquid-gas separation unit 104, and the dual-fuel engine 100 having the fuel circulation system 102. The liquid-gas separation unit 104 may include the exhaust conduit 134 coupled to the gaseous fuel supply conduit 112, and the separator 138 mounted on the exhaust conduit 134. The liquid-gas separation unit 104 may be adapted to receive the gaseous fuel along with the leaked liquid fuel from the gaseous fuel supply conduit 112, when the dual-fuel engine 100 is in the non-operational mode. Further, the liquid-gas separation unit 104 may be adapted to receive the leaked gaseous fuel along with the leaked liquid fuel from the drainage conduit 210, when the dual-fuel engine 100 is in the operational mode.

After receiving the mixture, the separator 138 may separate the leaked liquid fuel from the gaseous fuel before ejecting the gaseous fuel from the liquid-gas separation unit 104. The liquid-gas separation unit 104 may be coupled to with any fuel circulation system 102 of any dual-fuel engine 100. In one embodiment, in order to avail the functionalities of the liquid-gas separation unit 104, the separator 138 of the present disclosure may be mounted in an already existing exhaust conduit 134 of the fuel circulation system 102 of the dual-fuel engine 100.

Although the dual-fuel engine 100 is described to be employed in the locomotive, the scope of the implementation of the dual-fuel engine 100 of the present disclosure is not limited to the locomotives. In other embodiments, the dual-fuel engine 100 of the present disclosure may be employed in machines, such as a construction machine, a forest machine, a marine machine, and/or any other engine powered machine, without departing from the scope of the present disclosure.

Further, in the present embodiment, the dual-fuel engine 100 is running on diesel and natural gas as the liquid fuel and the gaseous fuel, respectively. In other embodiments, the dual-fuel engine 100 may use Liquefied Petroleum Gas (LPG) or hydrogen as the gaseous fuel, without departing from the scope of the present disclosure.

The liquid-gas separation unit 104, the fuel circulation system 102, and the dual-fuel engine 100 of the present disclosure offer a comprehensive approach for separation of the liquid fuel from the gaseous fuel. The liquid-gas separation unit 104 eliminates a possibility of wastage of the liquid fuel while venting out the gaseous fuel. This would avoid the inconvenience of frequent maintenance of the dual-fuel engine 100 owing to the leakage. The separated liquid fuel can be reused based on requirements. Therefore, an overall operational cost of the dual-fuel engine 100 is also minimized.

Further, in order to avail the functionality of the liquid-gas separation unit 104, the separator 138 may be disposed in the exhaust conduit 134 of the fuel circulation system 102 of the dual-fuel engine 100. Therefore, there is flexibility with regard to implementation of the liquid-gas separation unit 104 in the dual-fuel engine 100 of any machine. The functionalities of the present disclosure can be availed by making minor changes in an already existing construction of a fuel circulation system known in the art.

Furthermore, the liquid-gas separation unit 104 is capable of separating the liquid fuel from the gaseous fuel in any operational mode of the dual-fuel engine 100. Therefore, the present disclosure offers a wide range of application of the liquid-gas separation unit 104 in the dual-fuel engine 100. Moreover, all the components of the separator 138 are stationary. Therefore, inconvenience with regard to operation and maintenance of the moving parts is negated. Therefore, the present disclosure offers the liquid-gas separation unit 104, the fuel circulation system 102, and the dual-fuel engine 100 that are compact, simple, effective, economical, retro-fittable, and flexible.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A liquid-gas separation unit for a dual-fuel engine, the dual-fuel engine including a gaseous fuel supply module and a fuel injector, the liquid-gas separation unit comprising:
   a gaseous fuel supply conduit directly coupled to the gaseous fuel supply module and the fuel injector for delivery of a gaseous fuel from the gaseous fuel supply module to the fuel injector, a flow direction through the gaseous fuel supply conduit extending from the gaseous fuel supply module toward the fuel injector;
   an exhaust conduit having a first end and a second end opposite the first end, the first end of the exhaust conduit being fluidly coupled to the gaseous fuel supply conduit at a branch connection with the gaseous fuel supply conduit, the branch connection being located downstream of the gaseous fuel supply module and upstream of the fuel injector along the flow direction through the gaseous fuel supply conduit; and
   a separator having an inlet port, a first outlet port, and a second outlet port, the first outlet port and the second outlet port each being fluidly coupled to the inlet port within the separator,
   the inlet port of the separator being fluidly coupled to the second end of the exhaust conduit to receive a mixture of the gaseous fuel and a leaked liquid fuel from the gaseous fuel supply conduit, the leaked liquid fuel being leaked into the gaseous fuel supply conduit from the fuel injector,
   the first outlet port of the separator being fluidly coupled to a leaked fuel reservoir via a liquid drain conduit,
   the separator being configured to separate the leaked liquid fuel from the mixture and discharge the leaked liquid fuel to the leaked fuel reservoir via the first outlet port.

2. The liquid-gas separation unit of claim 1, wherein the separator comprises a plurality of baffle plates configured to swirl the mixture within the separator for separating the leaked liquid fuel from the gaseous fuel.

3. The liquid-gas separation unit of claim 1, wherein the exhaust conduit is adapted to receive the leaked liquid fuel along with the gaseous fuel during a non-operational mode of the dual-fuel engine.

4. The liquid-gas separation unit of claim 1, wherein the exhaust conduit is adapted to receive the leaked liquid fuel along with the gaseous fuel during an operational mode of the dual-fuel engine.

5. The liquid-gas separation unit of claim 1, wherein the leaked liquid fuel is diesel.

6. The liquid-gas separation unit of claim 1, wherein the gaseous fuel is natural gas.

7. A fuel circulation system for a dual-fuel engine, the fuel circulation system comprising:
   a gaseous fuel supply module;
   a fuel injector;
   a gaseous fuel supply conduit directly coupled to the gaseous fuel supply module and the fuel injector for delivery of a gaseous fuel from the gaseous fuel supply module to the fuel injector, a flow direction through the gaseous fuel supply conduit extending from the gaseous fuel supply module toward the fuel injector; and
   an exhaust conduit having a first end and a second end opposite the first end, the first end of the exhaust conduit being fluidly coupled to the gaseous fuel supply conduit at a branch connection with the gaseous fuel supply conduit, the branch connection being located downstream of the gaseous fuel supply module and upstream of the fuel injector along the flow direction through the gaseous fuel supply conduit; and
   a separator having an inlet port, a first outlet port, and a second outlet port, the first outlet port and the second outlet port each being fluidly coupled to the inlet port within the separator,
   the inlet port of the separator being fluidly coupled to the second end of the exhaust conduit to receive a mixture of the gaseous fuel and a leaked liquid fuel from the gaseous fuel supply conduit, the leaked liquid fuel being leaked into the gaseous fuel supply conduit from the fuel injector, the first outlet port of the separator being fluidly coupled to a leaked fuel reservoir via a liquid drain conduit, the separator being configured to separate the leaked liquid fuel from the mixture and discharge the leaked liquid fuel to the leaked fuel reservoir via the first outlet port.

8. The fuel circulation system of claim 7, further comprising:
a gaseous fuel conditioning module mounted along the gaseous fuel supply conduit and configured to condition the gaseous fuel for use in the dual-fuel engine before the gaseous fuel is supplied to the fuel injector; and
a check valve disposed downstream of the gaseous fuel conditioning module and configured to block a flow of the leaked liquid fuel from the fuel injector upstream through the check valve and toward the gaseous fuel conditioning module.

9. The fuel circulation system of claim 7, further comprising a liquid fuel supply conduit having a first end and a second end opposite the first end, the first end of the liquid fuel supply conduit receiving a liquid fuel into the fuel circulation system and the second end of the liquid fuel supply conduit being coupled to the fuel injector, wherein the liquid fuel supply conduit supplies the liquid fuel from the first end of the liquid fuel supply conduit to the fuel injector.

10. The fuel circulation system of claim 7, wherein the separator comprises a plurality of baffle plates configured to swirl the mixture within the separator for separating the leaked liquid fuel from the gaseous fuel.

11. The fuel circulation system of claim 7, wherein the exhaust conduit is adapted to receive the leaked liquid fuel along with the gaseous fuel during a non-operational mode of the dual-fuel engine.

12. The fuel circulation system of claim 7, wherein the exhaust conduit is adapted to receive the leaked liquid fuel along with the gaseous fuel during an operational mode of the dual-fuel engine.

13. The fuel circulation system of claim 7, wherein the leaked liquid fuel is diesel.

14. A dual-fuel engine comprising:
at least one combustion chamber;
at least one injector fluidly coupled to the at least one combustion chamber to inject at least one of a gaseous fuel and a liquid fuel into the at least one combustion chamber;
a gaseous fuel supply module;
a gaseous fuel supply conduit directly coupled to the gaseous fuel supply module and the at least one injector for delivery of the gaseous fuel from the gaseous fuel supply module to the at least one injector, a flow direction through the gaseous fuel supply conduit extending from the gaseous fuel supply module toward the at least one injector;
a gaseous fuel conditioning module mounted along the gaseous fuel supply conduit and configured to condition the gaseous fuel for use in the dual-fuel engine before the gaseous fuel is supplied to the at least one injector;
a check valve disposed along the gaseous fuel supply conduit downstream of the gaseous fuel conditioning module and configured to stop a flow of a leaked liquid fuel from the at least one injector upstream through the check valve and toward the gaseous fuel conditioning module;

an exhaust conduit having a first end and a second end opposite the first end, the first end of the exhaust conduit being fluidly coupled to the gaseous fuel supply conduit at a branch connection with the gaseous fuel supply conduit, the branch connection being located downstream of the check valve and upstream of the at least one injector along the flow direction through the gaseous fuel supply conduit; and a separator having an inlet port, a first outlet port, and a second outlet port, the first outlet port and the second outlet port each being fluidly coupled to the inlet port within the separator, the inlet port of the separator being fluidly coupled to the second end of the exhaust conduit to receive a mixture of the gaseous fuel and the leaked liquid fuel from the gaseous fuel supply conduit, the first outlet port of the separator being fluidly coupled to a leaked fuel reservoir via a liquid drain conduit, the separator being configured to separate the leaked liquid fuel from the mixture and discharge the leaked liquid fuel to the leaked fuel reservoir via the first outlet port.

15. The dual-fuel engine of claim 14, further comprising a liquid fuel supply conduit having a first end and a second end opposite the first end, the first end of the liquid fuel supply conduit being fluidly coupled to a liquid fuel supply to receive the liquid fuel and the second end of the liquid fuel supply conduit being coupled to the at least one injector, wherein the at least one injector receives the liquid fuel from the liquid fuel supply via the liquid fuel supply conduit.

16. The dual-fuel engine of claim 14, wherein the leaked liquid fuel is diesel.

17. The liquid-gas separation unit of claim 1, wherein the gaseous fuel supply conduit includes a check valve disposed downstream of the gaseous fuel supply module and upstream of the fuel injector along the flow direction through the gaseous fuel supply conduit,
the branch connection with the exhaust conduit is disposed downstream of the check valve along the flow direction through the gaseous fuel supply conduit, and
the check valve is configured to block a fluid flow upstream through the check valve and toward the gaseous fuel supply module.

18. The liquid-gas separation unit of claim 1, wherein the exhaust conduit includes a vent valve,
an open state of the vent valve being configured to effect fluid communication between the gaseous fuel supply conduit and the separator via the exhaust conduit, and
a closed state of the vent valve being configured to block fluid communication between the gaseous fuel supply conduit and the separator via the exhaust conduit.

19. The liquid-gas separation unit of claim 18, wherein the closed state of the vent valve does not block fluid communication between the gaseous fuel supply module and the fuel injector via the gaseous fuel supply conduit.

20. The liquid-gas separation unit of claim 1, wherein the separator is further configured to discharge the gaseous fuel separated from the mixture via the second outlet port, the second outlet port being distinct from the first outlet port.

* * * * *